United States Patent
Xu et al.

(10) Patent No.: US 12,148,207 B1
(45) Date of Patent: Nov. 19, 2024

(54) METHOD AND SYSTEM FOR INTELLIGENT IDENTIFICATION OF RICE GROWTH POTENTIAL BASED ON UAV MONITORING

(71) Applicant: ZHEJIANG LAB, Hangzhou (CN)

(72) Inventors: Fen Xu, Hangzhou (CN); Yinxing Ma, Hangzhou (CN); Xiaogang Xu, Hangzhou (CN); Xinghua Wei, Hangzhou (CN); Jun Wang, Hangzhou (CN); Yaolong Yang, Hangzhou (CN); Mengchen Zhang, Hangzhou (CN); Yue Feng, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/375,977

(22) Filed: Oct. 2, 2023

(30) Foreign Application Priority Data

Jun. 14, 2023 (CN) .......................... 202310701408.0

(51) Int. Cl.
*G06K 9/00* (2022.01)
*G06V 10/26* (2022.01)
(Continued)

(52) U.S. Cl.
CPC ............ *G06V 20/188* (2022.01); *G06V 10/26* (2022.01); *G06V 10/28* (2022.01); *G06V 10/74* (2022.01);
(Continued)

(58) Field of Classification Search
None
See application file for complete search history.

(56) References Cited

U.S. PATENT DOCUMENTS

| 8,939,885 B2 * | 1/2015 | Martin | ................. | A61M 21/02 |
| | | | | 600/27 |
| 10,664,702 B2 * | 5/2020 | Albrecht | .............. | G06V 20/188 |

(Continued)

FOREIGN PATENT DOCUMENTS

| CN | 106441442 A | * | 2/2017 | ............. | G01D 21/02 |
| CN | 110008912 A | * | 7/2019 | ............... | G06N 3/08 |

(Continued)

OTHER PUBLICATIONS

Mardanisamani et al., "Segmentation of vegetation and microplots in aerial agriculture images: A survey." The Plant Phenome Journal 5, No. 1 (2022): e20042. (Year: 2022).*

*Primary Examiner* — Feng Niu
(74) *Attorney, Agent, or Firm* — Jiwen Chen; Joywin IP Law PLLC

(57) ABSTRACT

Provided in the present invention is a method for intelligent identification of rice growth potential based on unmanned aerial vehicle (UAV) monitoring, the method including the following steps: obtaining rice plot images, labeling the images, establishing a deep convolutional neural network detection model, using the labeled rice plot images to optimize and train the model, inputting the rice plot images to be measured into the trained model, and detecting a location of a rice plot target frame in each image; selecting a target frame with the largest area in each rice plot image, and pre-processing a rice plot image in the target frame; and calculating a vegetation coverage rate of the pre-processed rice plot image, and determining a level of rice growth potential according to the vegetation coverage rate. Also provided in the present invention is a system for intelligent identification of rice growth potential based on unmanned aerial vehicle (UAV) monitoring. The method of the present invention has the advantages of simplicity, high precision, fast speed and low cost in the identification of the rice (Continued)

growth potential, and can be widely used in automatic and intelligent production management of agriculture.

6 Claims, 3 Drawing Sheets

(51) Int. Cl.
  *G06V 10/28* (2022.01)
  *G06V 10/74* (2022.01)
  *G06V 10/82* (2022.01)
  *G06V 20/10* (2022.01)
  *G06V 20/17* (2022.01)
  *G06V 20/70* (2022.01)
  *B64U 101/00* (2023.01)
  *B64U 101/30* (2023.01)
(52) U.S. Cl.
  CPC .............. *G06V 10/82* (2022.01); *G06V 20/17* (2022.01); *G06V 20/70* (2022.01); *B64U 2101/00* (2023.01); *B64U 2101/30* (2023.01)

(56) References Cited

U.S. PATENT DOCUMENTS

| | | | | |
|---|---|---|---|---|
| 10,846,843 | B2 * | 11/2020 | Gonzalez | G06V 20/17 |
| 11,490,055 | B2 * | 11/2022 | Wang | G06T 7/0012 |
| 11,495,016 | B2 * | 11/2022 | Meltzer | G06V 10/82 |
| 11,676,376 | B2 * | 6/2023 | Rao | G06V 10/26 382/162 |
| 11,710,308 | B1 * | 7/2023 | Kulpe | G06V 10/751 382/110 |
| 2018/0039853 | A1 * | 2/2018 | Liu | G06V 10/768 |
| 2018/0181593 | A1 * | 6/2018 | Ranzinger | G06V 10/82 |
| 2018/0373932 | A1 * | 12/2018 | Albrecht | G06V 20/188 |
| 2019/0188847 | A1 * | 6/2019 | Gonzalez | G06V 20/188 |
| 2022/0159218 | A1 * | 5/2022 | Wang | G06T 7/0004 |
| 2022/0301301 | A1 * | 9/2022 | Marciano, Jr. | G06F 18/217 |
| 2022/0358642 | A1 * | 11/2022 | Zeng | G06T 7/0012 |
| 2022/0398841 | A1 * | 12/2022 | Tsunashima | G06Q 50/02 |
| 2023/0005260 | A1 * | 1/2023 | Rao | G06V 20/188 |
| 2023/0017425 | A1 * | 1/2023 | Bereciartua-Perez | G06T 7/0002 |

FOREIGN PATENT DOCUMENTS

| | | | | |
|---|---|---|---|---|
| CN | 110532936 | A | * | 12/2019 |
| CN | 111860038 | A | * | 10/2020 ......... G06K 9/00657 |
| CN | 115018770 | A | * | 9/2022 |
| CN | 115424152 | A | * | 12/2022 |
| CN | 115438934 | A | * | 12/2022 |
| CN | 115481368 | A | * | 12/2022 |
| JP | 2017046639 | A | * | 3/2017 |
| WO | WO-2010083018 | A1 | * | 7/2010 ......... G06T 7/0081 |
| WO | WO-2020000043 | A1 | * | 1/2020 |

* cited by examiner

METHOD AND SYSTEM FOR INTELLIGENT IDENTIFICATION OF RICE GROWTH POTENTIAL BASED ON UAV MONITORING

This application claims priority of Chinese Application No. 2023107014080, filed Jun. 14, 2023, which is hereby incorporated by reference.

FIELD OF TECHNOLOGY

The present invention belongs to the field of agricultural technology and relates to a technology of the computer vision field, in particular to a method and system for intelligent identification of rice growth potential based on unmanned aerial vehicle (UAV) monitoring.

BACKGROUND TECHNOLOGY

Rice growth potential is an important agronomic parameter to evaluate its growth, which mainly refers to flourishing degrees of different varieties of rice in the same period or flourishing degrees of the same variety of rice in different periods. Early birth and rapid growth are of great significance for resisting stress in a peak growth stage and providing more material conversion for a high yield in a later growth stage.

Traits of different varieties of rice in the same period are comparable, traits of the same variety of rice in different periods are comparable, but traits of different varieties of rice in different periods are not comparable. For images of one period, growth potential of level 9 is definitely stronger than that of level 1, which is a difference in the growth potentials by comparing under the same starting point (starting from seeding). If there are images of two periods, for the second time, it would again be graded on a scale of 1-9. One way to do this is to do the same as the first time and compare the images to the ones at the time of seeding, that is an absolute growth potential. The second way is to compare the images with that at the first time, in which a relative growth potential can be defined, a level of a variety at the first time is 1 level, the level of the variety at the second time is also 1 level, then the relative growth potential can be considered as 1 level (according to a division method) or 0 level (according to a subtraction method). If it is 9 level at the second time, the relative growth potential is 9 level (according to the division method) or 8 level (according to the subtraction method). At present, the growth potential is mainly evaluated by one period (about 2 weeks after transplanting).

In recent years, Unmanned Aerial Vehicles (UAVs) have been widely used in smart agriculture, the UAVs have the characteristics of maneuverability and flexibility, and they are equipped with cameras and sensors for farmland monitoring so that they are not easy to be affected by weather, have less disturbance to crop growth, and can obtain high-resolution images, which is of great significance to assist accurate management of farmland. The traditional method of evaluating the growth potential needs a professional to go to a field to identify the growth potential by naked eyes, which is low in efficiency, high in cost and large in error when obtaining the growth potentials of a large range and a plurality of varieties of rice.

A patent application with a publication number of CN 110532936A discloses a method and system for identifying green plants in monitored images of growth potential of crops in a big field. It uses a image monitor to monitor a growth process of the crops in the big field. Through a monitored image segmentation module, it uses an image segmentation program to segment and process the collected monitored images of the crops in the big field, uses an identification program to identify the growth potential from images of the crops in the big field, uses a classification program to classify type characteristics of the crops in the big field, uses a construction program to construct a growth model of the crops in the big field, and uses an analysis program to analyze the growth potential of the crops in the big field. In this invention, it establishes the growth model of the crops and analyzes a relationship among natural environment variables, artificial variables and growth states in a process of crop growth.

A patent application with a publication number of CN 115393723A discloses a system and method for monitoring growth potential of crops and monitoring pests and disasters, wherein the method comprises: obtaining a high-resolution image of crop monitoring and meteorological condition data of a crop planting field; carrying out image cutting to obtain a complete crop screenshot, and identifying a single crop by model comparison; utilizing a neural network model to identify the growth potential of the crops; carrying out a local amplification treatment, identifying pests and disasters, and transmitting an identification result and the growth potential of the crops to a planter. In this invention, it identifies the images, compares real-time monitored images with a preset image, and determines the growth potential of the crops.

Although it has a certain basis for the study of the method for monitoring the growth potential of the crops in the prior art, existing methods for predicting the growth potential of the crops usually need to consider the effects of natural environment variables, meteorological condition data and artificial variables, and the monitoring methods are relatively complicated and inefficient. In addition, there are few researches on the methods for monitoring the rice growth potential.

A YOLO neural network architecture uses a YOLO algorithm, and its full name is You Only Look Once: Unified, Real-Time Object Detection, You Only Look Once indicates that only one CNN operation is required, wherein Unified indicates that this is a unified framework, providing an end-to-end prediction; Real-Time is reflected in a fast speed of the Yolo algorithm; and Object Detection indicates a target detection. A YOLOv5 is a newer version of YOLO neural network series, which has high detection accuracy and a fast speed, and has a great practical application value. The YOLOv5s is a network with the smallest depth and the smallest width of a feature map in YOLOv5 series, which is very suitable for a detection of rice plots.

Therefore, a YOLOv5s neural network model is used to monitor the rice growth potential, so as to solve problems of low efficiency, high cost, large error and complexity of the existing methods for evaluating the rice growth potential, which has important scientific guiding significance for the growth of rice and the improvement of yield in the later stage.

SUMMARY OF THE INVENTION

To solve the above technical problems, proposed in the present invention is a method for intelligent identification of a rice growth potential based on unmanned aerial vehicle (UAV) monitoring. This method is easy to operate and has strong portability, and can realize accurate identification of growth potentials of various varieties of rice planted in a field.

A method for intelligent identification of a rice growth potential based on unmanned aerial vehicle (UAV) monitoring, the method comprising the following steps:

S1. obtaining rice plot images, labeling the rice plot images, obtaining the labeled rice plot images, establishing a deep convolutional neural network detection model, using the labeled rice plot images to optimize and train the deep convolutional neural network detection model, inputting the rice plot images to be measured into the trained deep convolutional neural network detection model, and detecting a location of a rice plot target frame in each rice plot image;

S2. selecting a target frame with the largest area in each rice plot image, and pre-processing a rice plot image in the target frame; and S3. calculating a vegetation coverage rate of the pre-processed rice plot image, and determining a level of rice growth potential according to the vegetation coverage rate.

Further, in step S1, a method of obtaining the rice plot images is as follows: a UAV is used to photograph complete images in planting plots of various varieties of rice in turn in a top-down view angle of 90°, an image resolution greater than or equal to 12 million pixels, and a target plot located in the center of a field of view, a width accounting for more than 80% of a field of view width, wherein trying not to include a target of other plots when photographing.

Further, in step S1, when labeling the rice plot images, all visible plots in the images are labeled, including an incomplete plot of other varieties of rice photographed.

Further, in step S1, the step of establishing a deep convolutional neural network detection model, and using the labeled rice plot images to optimize and train the deep convolutional neural network detection model is as follows: selecting a pre-trained YOLOv5s model as the deep convolutional neural network detection model, and using the labeled rice plot images as a training set to optimize and train the model.

The captured rice plot images to be measured are input into the trained YOLOv5s rice plot detection model one by one, and the positions of the target frames of the rice plot in each rice plot image is detected.

Further, in step S2, a specific step of selecting a target frame with the largest area in each rice plot image, and pre-processing a rice plot image in the target frame is as follows: selecting the target frame with the largest area in each image and cropping for the rice plot images in the target frames; then adjusting the cropped images to be the same size; and finally cutting edges of the adjusted images.

Specifically, there are generally a plurality of target frames on each image obtained by the YOLOv5s rice plot detection model, which requires some pre-processing operations. Firstly, the rice plot image in the target frame with the largest area in each image is screened out as a target output, and the rice plot image in the target frame is cut out; in order to conveniently remove an excess area on the edges, the cut out images are adjusted to the same size, and then the edges of the adjusted images of the same size are cut out, that is, pixels of a specified size are cut off from the beginning and end of each long side and the beginning and end of each short side of the images, and finally the rice plot images of the same size are obtained.

The identification of rice growth potential is generally determined by the degree of vegetation luxuriance, and the degree of vegetation luxuriance is generally positively correlated with the vegetation coverage rate. Therefore, the level of the rice growth potential is determined by the vegetation coverage rate.

Further, in step S3, a specific step for calculating a vegetation coverage rate of the pre-processed rice plot image, and determining a level of rice growth potential according to the vegetation coverage rate is as follows:

S301. using an excess green index ExG to enhance a difference between rice and a surrounding ground feature so as to efficiently separating the rice and background;

since an image of rice before heading is generally green under natural light, the excess green index ExG is first used to separate the rice and background, and a calculation formula of the excess green index ExG is as follows:

$$ExG = 2G - R - B$$

wherein R, G and B are values of red, green and blue channels of visible light respectively.

S302. selecting an adaptive threshold method Otsu to binarize images processed in S301 so as to obtain the binarized images, wherein in the binarized images, white pixels represent rice regions and black pixels represent background regions;

S303. calculating the vegetation coverage rate p according to pixel values of white regions in the binarized images, and a calculation formula of the vegetation coverage rate p is as follows:

Vegetation coverage rate $p$=pixels occupied by vegetation in an image/total pixels of the image*100%

S304. according to the vegetation coverage rate of each variety of rice, determining the level of the rice growth potential.

Further, in step S304, the levels of the rice growth potential are classified into five levels on demands, and the calculation step of determining the level of the rice growth potential is as follows:

S3041. calculating the maximum vegetation coverage rate max_p in all rice plot images to be measured;

S3042. calculating the minimum vegetation coverage rate min_p in all rice plot images to be measured;

S3043. calculating a step size: step=(max_p−min_p)/5;

S3044. determining the level of the rice growth potential, when the vegetation coverage rate of rice p<min_p+n1×step, wherein n1=0~2, the level of the rice growth potential is 1;

when min_p+n1×step≤p<min_p+n2×step, wherein n2=0.3~2.5 and n2>n1, the level of the rice growth potential is 3; and when min_p+n2×step≤p<min_p+n3×step, wherein n3=1~3.5 and n3>n2, the level of the rice growth potential is 5; and when min_p+n3×step≤p<min_p+n4×step, wherein n4=2~4.5 and n4>n3, the level of the rice growth potential is 7; and when p≥min_p+n4×step, the level of the rice growth potential is 9.

Additionally provided in the present invention is a system for intelligent identification of a rice growth potential based on unmanned aerial vehicle (UAV) monitoring, the system comprising:

a detecting module, wherein the detecting module is used for obtaining rice plot images, labeling the rice plot images, obtaining the labeled rice plot images, establishing a deep convolutional neural network detection model, using the labeled rice plot images to optimize and train the deep convolutional neural network detection model, inputting the rice plot images to be measured into the trained deep convolutional neural network detection model, and detecting a location of a rice plot target frame in each rice plot image;

an image pre-processing module, wherein the image pre-processing module is used for selecting a target frame with the largest area in each rice plot image, and pre-processing a rice plot image in the target frame; and a growth potential identifying module, wherein the growth potential identifying module is used for calculating a vegetation coverage rate of the pre-processed rice plot image, and determining a level of rice growth potential according to the vegetation coverage rate.

Additionally provided in the present invention is a computer device, comprising a processor and a memory for storing a processor executable program, wherein when the processor executes the program stored in the memory, the above method for intelligent identification of a rice growth potential based on unmanned aerial vehicle (UAV) monitoring is implemented.

Additionally provided in the present invention is a storage medium, which stores a program, wherein when the program is executed by a processor, the above method for intelligent identification of a rice growth potential based on unmanned aerial vehicle (UAV) monitoring is implemented.

Compared with the prior art, the present invention has the following beneficial effects:

1. The method for intelligent identification of a rice growth potential based on UAV monitoring can divide the identification of the rice growth potential into three cascade steps, and each step can achieve its own goal, so the realization method is simple, and the selection of realization scheme in each step is more flexible;
2. The present invention adopts the UAV to collect the rice plot images, and uses the trained detection model based on the deep convolutional neural network to automatically detect the rice plot images to be measured, avoiding manual calibration and saving time and effort; and
3. The present invention automatically determines the level of the rice growth potential according to the vegetation coverage rate, does not require the participation of professional and technical personnel, has a low cost and strong portability, and can realize the accurate identification of the growth potentials of various varieties of rice planted in the field.

BRIEF DESCRIPTION OF THE DRAWINGS

The drawings described herein are intended to provide a further understanding of the present invention, and are intended to be a part of this invention. The schematic embodiments of this invention and their descriptions are used to interpret this invention and do not constitute an undue limitation of this invention.

DESCRIPTION OF THE EMBODIMENTS

In order to make the purpose, technical solutions and advantages of this application clearer, in the following, the technical solutions of this application would be clearly and completely described in combination with specific embodiments of this application and the corresponding drawings. Obviously, the embodiments described are only part of the embodiments of this application and not the whole embodiments. Based on the embodiments in this application, all other embodiments obtained by an ordinary person skilled in the art without creative labor are within the protection scope of this application.

Rice growth potential is an important agronomic parameter to evaluate its growth, and evaluation of the rice growth potential has important scientific guiding significance for growth of rice and improvement of yield in a later period. However, in an existing rice planting process, monitoring of the rice growth potential mainly relies on manual inspection on the site, which has low operation efficiency and a low sampling rate.

The present invention obtains rice plot images by an unmanned aerial vehicle (UAV), and uses a trained deep convolutional neural network detection model to obtain a position of a target frame of a rice plot in each image; pre-processes a rice plot image in a target frame with the maximum area; and calculates a vegetation coverage rate of the pre-processed rice plot image to determine a level of the rice growth potential. The method of the present invention has the advantages of simplicity, high precision, fast speed and low cost in the identification of the rice growth potential, and can be widely used in automatic and intelligent production management of agriculture.

Figure 1:
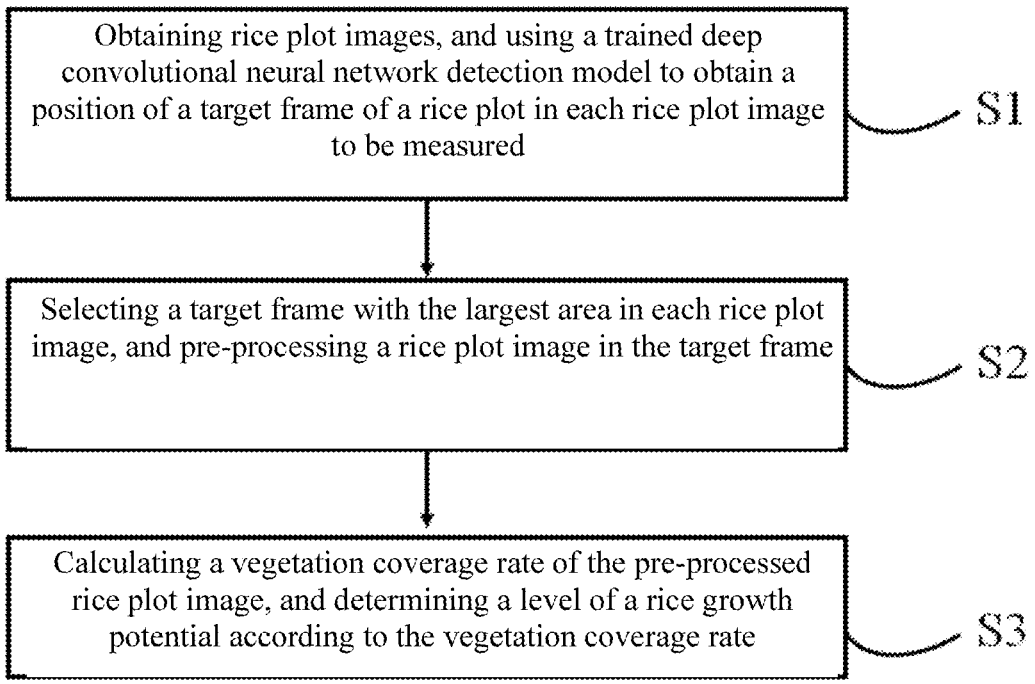
FIG. 1 is a flow chart of a method for intelligent identification of a rice growth potential based on unmanned aerial vehicle (UAV) monitoring in an embodiment.

FIG. 1 is a flow chart of a method for intelligent identification of a rice growth potential based on unmanned aerial vehicle (UAV) monitoring in an embodiment, the method comprising the following steps:

S1. obtaining rice plot images, labeling the rice plot images, obtaining the labeled rice plot images, establishing a deep convolutional neural network detection model, using the labeled rice plot images to optimize and train the deep convolutional neural network detection model, inputting the rice plot images to be measured into the trained deep convolutional neural network detection model, and detecting a location of a rice plot target frame in each rice plot image.

In general breeding, a plurality of varieties of rice are planted in a field at the same time, and a region where a single variety of rice is planted in the field is called a rice plot. The rice in a single rice plot is generally planted by rows and columns, with a certain distance between rice plants (generally about 10 cm), and the whole plot is distributed in a rectangle. A distance between rice plots would be larger than the distance between rice plants, which is generally two to three times of the distance between the rice plants.

Specifically, in this embodiment, a method of obtaining rice plot images is as follows: a UAV is used to photograph complete images in planting plots of various varieties of rice in turn in a top-down view angle of 90°, an image resolution greater than or equal to 12 million pixels, and a target plot located in the center of a field of view, a width accounting for more than 80% of a field of view width, wherein trying not to include a target of other plots when photographing.

Specifically, in this embodiment, when labeling the rice plot images, all visible plots in the images are labeled, including an incomplete plot of other varieties of rice photographed.

Figure 2:
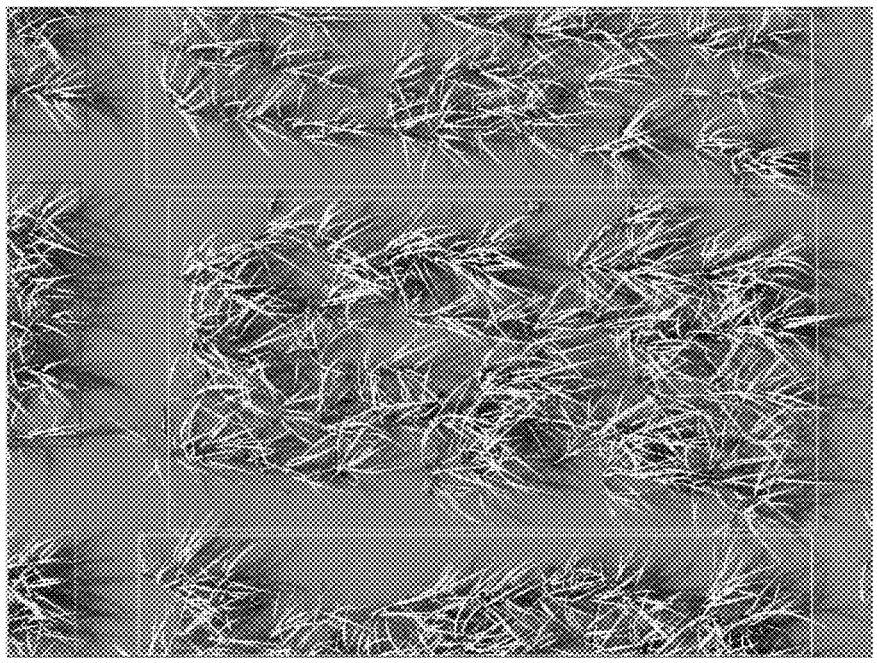
FIG. 2 is a schematic diagram of labeling a training set of rice plot images in an embodiment.

Specifically, in this embodiment, a pre-trained YOLOv5s model is selected as the deep convolutional neural network detection model, and labeled rice plot images are used as a training set to optimize and train the model. FIG. 2 is a schematic diagram of labeling a training set of rice plot images in an embodiment.

Figure 3:
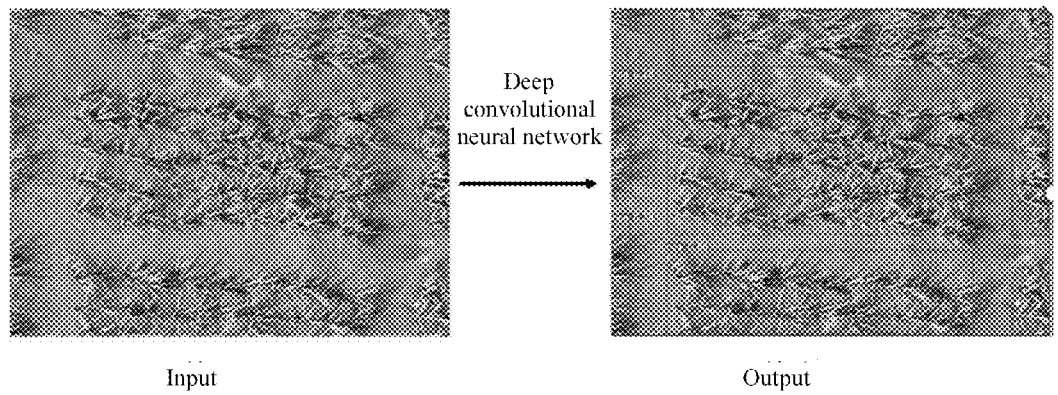
FIG. 3 is a schematic diagram of a detection result of the rice plot images in an embodiment.

FIG. 3 is a schematic diagram of a detection result of the rice plot images through the YOLOv5s rice plot detection model in an embodiment. In this embodiment, the photographed rice plot images to be measured are input into the trained YOLOv5s rice plot detection model one by one, and the positions of the target frames of the rice plots in each image are detected.

S2. selecting a target frame with the largest area in each rice plot image, and pre-processing a rice plot image in the target frame.

Figure 4:
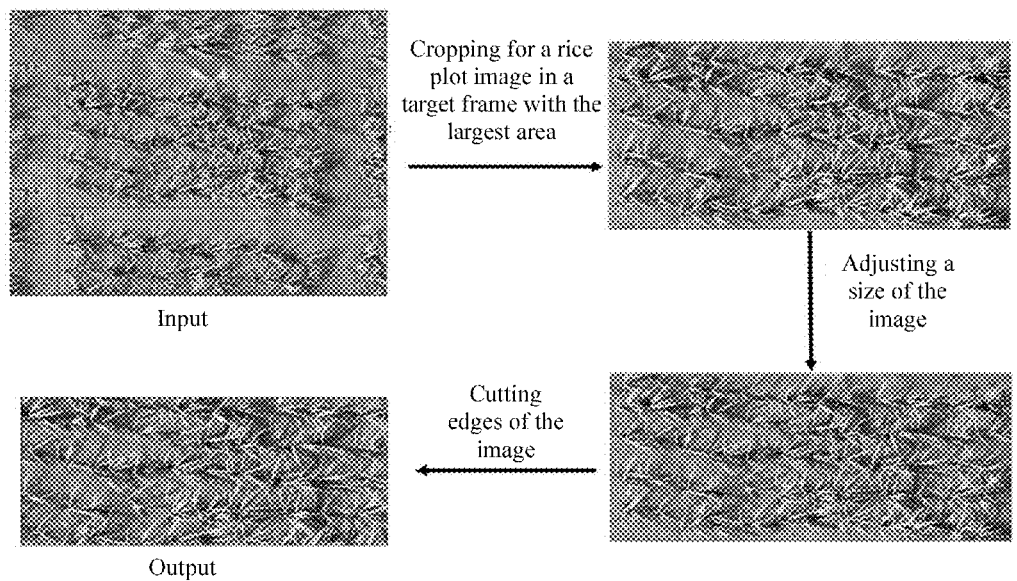
FIG. 4 is a schematic diagram of a pre-processing process of the rice plot images in an embodiment.

Specifically, there are generally a plurality of target frames in each image obtained by the YOLOv5s rice plot detection model, which require some pre-processing operations first. FIG. 4 is a schematic diagram of a pre-processing process of the rice plot images in an embodiment. In this embodiment, a rice plot in the target frame with the largest area in each image is first screened out as a target output, and the rice plot image in the target frame is cropped out. In order to facilitate removal of an excess edge area, in this embodiment, the cropped images are adjusted to the same size 1200×500, and then the edges of the adjusted 1200×500 images are cut out. 100 pixels are cut off from each end of a long side of the images, and 50 pixels are cut off from each end of a short side. The size of the images after cutting off the edge is 1000×400.

S3. calculating a vegetation coverage rate of the pre-processed rice plot image, and determining a level of rice growth potential according to the vegetation coverage rate.

Specifically, the identification of the rice growth potential is generally determined by a degree of vegetation luxuriance, and the degree of vegetation luxuriance is generally positively correlated with the vegetation coverage rate. Therefore, the level of the growth potential is determined by the vegetation coverage rate in the present invention.

S301. using an excess green index ExG to enhance a difference between rice and a surrounding ground feature so as to efficiently separating the rice and background.

since an image of rice before heading is generally green under natural light, the excess green index ExG is first used to separate the rice and background, and a calculation formula of the excess green index ExG is as follows:

$$ExG = 2G - R - B$$

wherein R, G and B are values of red, green and blue channels of visible light respectively.

Figure 5:
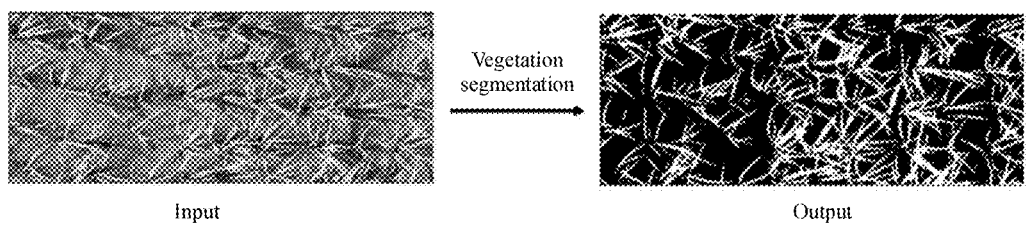
FIG. 5 is a schematic diagram for segmenting vegetation of the rice plot images in an embodiment.

S302. selecting an adaptive threshold method Otsu to binarize the images processed in S301 so as to obtain the binarized images, wherein in the binarized images, white pixels represent a rice region and black pixels represent a background region, and FIG. 5 is a schematic diagram for segmenting vegetation of the rice plot images in an embodiment of the present invention.

S303. calculating the vegetation coverage rate p according to pixel values of white regions in the binarized images, and a calculation formula of the vegetation coverage rate p is as follows:

Vegetation coverage rate $p$=pixels occupied by vegetation in an image/total pixels of the image*100%

S304. according to the rice coverage rate of each variety of rice, determining the level of the rice growth potential.

Further, in step S304, the levels of the rice growth potential are classified into five levels on demands. In this embodiment, the steps for determining the level of the rice growth potential are as follows:

S3041. calculating the maximum vegetation coverage rate max_p in all rice to be measured;

S3042. calculating the minimum vegetation coverage rate min_p in all rice to be measured;

S3043. calculating a step size: step=(max_p−min_p)/5;

S3044. determining the level of the rice growth potential, when the vegetation coverage rate of rice p<min_p+n1×step, wherein n1=0~2, the level of the rice growth potential is 1;

when min_p+n1×step≤ p<min_p+n2×step, wherein n2=0.3~2.5 and n2>n1, the level of the rice growth potential is 3; and when min_p+n2×step≤p<min_p+n3×step, wherein n3=1~3.5 and n3>n2, the level of the rice growth potential is 5; and when min_p+n3×step≤p<min_p+n4×step, wherein n4=2~4.5 and n4>n3, the level of the rice growth potential is 7; and when p≥min_p+n4×step, the level of the rice growth potential is 9.

In one embodiment of the present invention, n1=0.3; n2=0.8; n3=1.8; n4=2.8.

Also provided in this embodiment is a system for intelligent identification of a rice growth potential based on unmanned aerial vehicle (UAV) monitoring, the system comprising:

a detecting module, wherein the detecting module is used for obtaining rice plot images, labeling the rice plot images, obtaining the labeled rice plot images, establishing a deep convolutional neural network detection model, using the labeled rice plot images to optimize and train the deep convolutional neural network detection model, inputting the rice plot images to be measured into the trained deep convolutional neural network detection model, and detecting a location of a rice plot target frame in each rice plot image;

an image pre-processing module, wherein the image pre-processing module is used for selecting a target frame with the largest area in each rice plot image, and pre-processing a rice plot image in the target frame; and a growth potential identifying module, wherein the growth potential identifying module is used for calculating a vegetation coverage rate of the pre-processed rice plot image, and determining a level of rice growth potential according to the vegetation coverage rate.

Additionally provided in this embodiment is a computer device, comprising a processor and a memory for storing a processor executable program, wherein when the processor executes the program stored in the memory, the above method for intelligent identification of a rice growth potential based on unmanned aerial vehicle (UAV) monitoring is implemented.

Additionally provided in this embodiment is a storage medium, which stores a program, wherein when the program is executed by a processor, the above method for intelligent identification of a rice growth potential based on unmanned aerial vehicle (UAV) monitoring is implemented.

The descriptions above are only preferred embodiments of the present invention, but are not intended to limit the present invention. Any modifications, equivalent substitutions, improvement and the like made within the spirit and principles of the present invention are all intended to within the protection scope of the present invention.

The invention claimed is:

1. A method for intelligent identification of rice growth potential based on unmanned aerial vehicle (UAV) monitoring, the method comprising the following steps in the following order:

S1: obtaining a first set of rice plots images, labeling the first set of rice plots images by each single plot, obtaining a labeled first set of rice plots images, establishing a deep convolutional neural network detection model, using the labeled first set of rice plots images to optimize and train the deep convolutional neural network detection model, providing and inputting a second set of rice plots images to be measured for rice growth potential into the trained deep convolutional neural network detection model, and identifying and outputting positions of rice plot target frames in each rice plots image of the second set of rice plots images by the trained deep convolutional neural network detection model, wherein each rice plot target frame surrounds one rice plot in each rice plots image of the second set of rice plots images;

S2: selecting a rice plot target frame with the largest area in each outputted rice plots image after calculating areas within the rice plot target frames, and pre-processing a surrounded rice plot image obtained by cropping the selected rice plot target frame from each outputted rice plots image; wherein the pre-processing the surrounded rice plot image is as follows: adjusting the surrounded rice plot images to be a pre-set size; and cutting edges of the adjusted surrounded rice plot images; and S3: calculating a vegetation coverage rate of the pre-processed rice plot image, and determining a level of rice growth potential according to the vegetation coverage rate; wherein specific steps for calculating a vegetation coverage rate of the pre-processed surrounded rice plot image, and determining a level of rice growth potential according to the vegetation coverage rate are as follows:

S301: using an excess green index ExG to enhance a difference between rice and a surrounding ground feature;

S302: selecting an adaptive threshold method Otsu to binarize images processed in S301 to obtain the binarized images, wherein in the binarized images, white pixels represent rice regions and black pixels represent background regions;

S303: calculating the vegetation coverage rate according to pixels of white regions in the binarized images, and a calculation formula of the vegetation coverage rate $p$ being as follows:

vegetation coverage rate $p$=pixels occupied by vegetation in an image/total pixels of the image*100%; and S304: according to the vegetation coverage rate of each variety of rice, determining the level of the rice growth potential; wherein the rice growth potential is classified into five levels, and the steps of determining the level of the rice growth potential are as follows:

S3041: selecting the maximum vegetation coverage rate max_p in the second set of rice plots images to be measured;

S3042: selecting the minimum vegetation coverage rate min_p in the second set of rice plots images to be measured;

S3043: calculating a step size: step=(max_p−min_p)/5;

S3044: determining the level of the rice growth potential, when the vegetation coverage rate of rice p<min_p+n1× step, wherein n1=0~2, the level of the rice growth potential is 1;

when min_p+n1×step≤p<min_p+n2×step, wherein n2=0.3~2.5 and n2>n1, the level of the rice growth potential is 3; and when min_p+n2×step≤p<min_p+n3×step, wherein n3=1~3.5 and n3>n2, the level of the rice growth potential is 5; and when min_p+n3×step≤p<min_p+n4×step, wherein n4=2~4.5 and n4>n3, the level of the rice growth potential is 7; and when p≥min_p+n4×step, the level of the rice growth potential is 9.

2. The method for intelligent identification of rice growth potential based on UAV monitoring according to claim 1, wherein in the step S1, a method of obtaining the first set of rice plots images is as follows: a UAV is used to photograph complete images in planting plots of various varieties of rice in turn in a top-down view angle of 90°, an image resolution greater than or equal to 12 million pixels, and a target plot located in the center of a field of view, a width accounting for more than 80% of a field of view width.

3. The method for intelligent identification of rice growth potential based on UAV monitoring according to claim 1, wherein in the step S1, when labeling the first set of rice plots images, all visible plots in the images are labeled, including an incomplete plot of other varieties of rice photographed.

4. The method for intelligent identification of rice growth potential based on UAV monitoring according to claim 1, wherein in the step S1, the step of establishing a deep convolutional neural network detection model, and using the labeled first set of rice plots images to optimize and train the deep convolutional neural network detection model is as follows: selecting a pre-trained YOLOv5s model as the deep convolutional neural network detection model, and using the labeled first set of rice plots images as a training set to optimize and train the model.

5. A computer device, comprising a processor and a memory for storing a processor executable program, wherein when the processor executes the program stored in the memory, the method for intelligent identification of rice growth potential based on unmanned aerial vehicle (UAV) monitoring according to claim 1 is implemented.

6. A non-transitory storage medium, which stores a program, wherein when the program is executed by a processor, the method for intelligent identification of rice growth potential based on unmanned aerial vehicle (UAV) monitoring according to claim 1 is implemented.

* * * * *